United States Patent [19]
Grochowski

[11] Patent Number: 5,181,792
[45] Date of Patent: Jan. 26, 1993

[54] RETAINER FOR SPLINED MEMBERS

[75] Inventor: Edwin T. Grochowski, Howell, Mich.

[73] Assignee: General Motors Corporation, Detroit, Mich.

[21] Appl. No.: 850,736

[22] Filed: Mar. 13, 1992

[51] Int. Cl.$^5$ .............................................. B25G 3/28
[52] U.S. Cl. ................................. 403/359; 403/377; 403/261
[58] Field of Search ............... 403/359, 372, 377, 261, 403/252

[56] References Cited

U.S. PATENT DOCUMENTS

| | | | |
|---|---|---|---|
| 3,561,799 | 2/1971 | Hutchinson | 403/377 X |
| 4,222,310 | 9/1980 | Garrett et al. | 403/372 X |
| 4,514,108 | 4/1985 | Sagady | 403/359 |
| 4,756,640 | 7/1988 | Gehrke | 403/359 X |

FOREIGN PATENT DOCUMENTS 1458977 10/1966 France ................................ 403/372

Primary Examiner—Andrew V. Kundrat
Attorney, Agent, or Firm—Donald F. Scherer

[57] ABSTRACT

A retainer embodying the concepts of the present invention is adapted for releasably securing a splined radially innermost rotatable member to a splined radially outermost rotatable member. The retainer so secures the rotatable members in order to preclude relative axial displacement therebetween. The retainer has a body portion. A first stop surface is presented from the body portion to engage one of the rotatable members and thereby preclude relative axial movement between the body portion and that rotatable member in one axial and directional frame of reference. A first dog extends outwardly from the body portion to engage the same rotatable member engaged by the first stop surface and thereby preclude relative axial movement between the body portion and that rotatable member in the opposite axial and directional frame of reference. A second stop surface is presented from the body portion to engage the second of the rotatable members and thereby preclude relative axial movement between the body portion and the second rotatable member in one axial and directional frame of reference. A second dog extends outwardly from the body portion to engage the second rotatable member and thereby preclude relative axial movement between the body portion and the second rotatable member in the opposite axial and directional frame of reference. The dogs are adapted releasably to engage the rotatable members.

6 Claims, 5 Drawing Sheets

RETAINER FOR SPLINED MEMBERS

TECHNICAL FIELD

The present invention relates generally to splined rotatable members. More particularly, the present invention relates to a retaining member for splined members. Specifically, the present invention relates to a new and novel retainer that effects the axial coupling of splined rotatable members.

BACKGROUND OF THE INVENTION

Splines are typically employed to effect a rotational connection between radially inner and radially outer rotatable members. However, the spline itself does not preclude relative axial movement between the radially inner and the radially outer members. To obviate relative axial movement between the splined members, the prior art typically employs a snap ring that coacts with an opposed shoulder. For example, such prior art arrangements typically achieve the desired axial coupling by confining either the radially innermost or the radially outermost spline member between a shoulder on the other spline member and securing the confined member by a snap ring. However, insertion, use and/or removal of the snap ring is fraught with several inherent problems.

Embodiments in which the snap ring is received in the radially outermost member of the spline members often require that the outermost member be provided with additional thickness in order to provide an adequate groove into which the snap ring may be received. Additionally, there must also be a sufficient radial access between the innermost and the outermost rotatable members to permit the snap ring to be assembled into or disassembled from the groove provided in the outermost splined member.

Embodiments in which the snap ring is received in the radially innermost member generally require additional components in order to keep the snap ring from disengaging by radial expansion during high speed rotation. The additional components may be attached to the outermost member, thus requiring additional space for that member. Furthermore, a sufficient radial access is also required to assemble or disassemble the snap ring into or from a groove within the radially innermost member.

SUMMARY OF THE INVENTION

It is, therefore, a primary object of the present invention to provide an improved retainer for securing a splined radially innermost rotatable member to a splined radially outermost rotatable member in order to preclude axial displacement between the splined rotatable members.

It is another object of the present invention to provide a retainer, as above, that eliminates the need for a snap ring.

It is a further object of the present invention to provide a retainer, as above, that eliminates the need for increasing the thickness of either rotatable member in order to accommodate the retainer.

It is a still further object of the present invention to provide a retainer, as above, that requires no additional parts to prevent disengaging expansion during rotation of the splined members conjoined thereby.

It is yet another object of the present invention to provide a retainer, as above, that does not require additional radial space between the rotatable members to facilitate assembly but is, instead, adapted to be demountably interposed between the rotatable members.

It is an even further object of the present invention to provide a retainer, as above, which utilizes space efficiently.

These and other objects of the invention, as well as the advantages thereof over existing and prior art forms, which will be apparent in view of the following detailed specification, are accomplished by means hereinafter described and claimed.

In general, a retainer embodying the concepts of the present invention is adapted for releasably securing a splined radially innermost rotatable member to a splined radially outermost rotatable member. The retainer secures the rotatable members in such a way as to preclude relative axial displacement therebetween. The retainer has a body portion. A first stop surface is presented from the body portion to engage one of the rotatable members and thereby preclude relative axial movement between the body portion and that rotatable member in one axial and directional frame of reference. A first dog extends outwardly from the body portion to engage the same rotatable member engaged by the first stop surface and thereby preclude relative axial movement between the body portion and that rotatable member in the opposite axial and directional frame of reference.

A second stop surface is presented from the body portion to engage the second of the rotatable members and thereby preclude relative axial movement between the body portion and the second rotatable member in one axial and directional frame of reference. A second dog extends outwardly from the body portion to engage the second rotatable member and thereby preclude relative axial movement between the body portion and the second rotatable member in the opposite axial and directional frame of reference.

The first and second dogs are both adapted releasably to engage the rotatable members.

Two embodiments of a retainer embodying the concepts of the present invention are shown by way of example in the accompanying drawings and are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
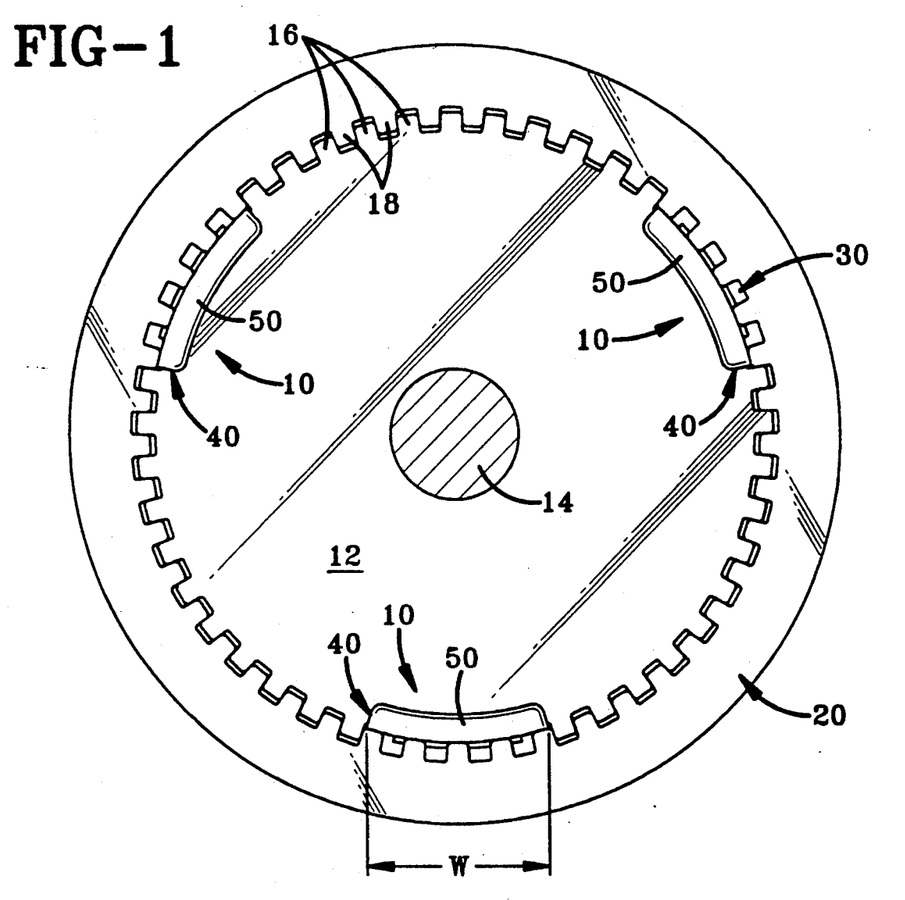
FIG. 1 is an end elevation of two rotatable splined members locked together by a plurality of retainers which embody the concepts of the present invention.

One representative form of a retainer embodying the concepts of the present invention is designated generally by the numeral 10 in FIGS. 1-4 of the accompanying drawings. As shown in FIG. 1, a radially innermost member 12 is mounted on a shaft 14 for rotation. The radially outer periphery of the innermost rotatable member 12 is provided with a plurality of teeth 16 in order to engage the opposed and meshing teeth 18 on the rotatable outermost member 20. While a plurality of these retainers 10 may be utilized to secure a splined connection between rotatable innermost and outermost members 12 and 20, respectively, only one retainer 10 need be described herein to convey the concepts of the present invention.

Figure 2:
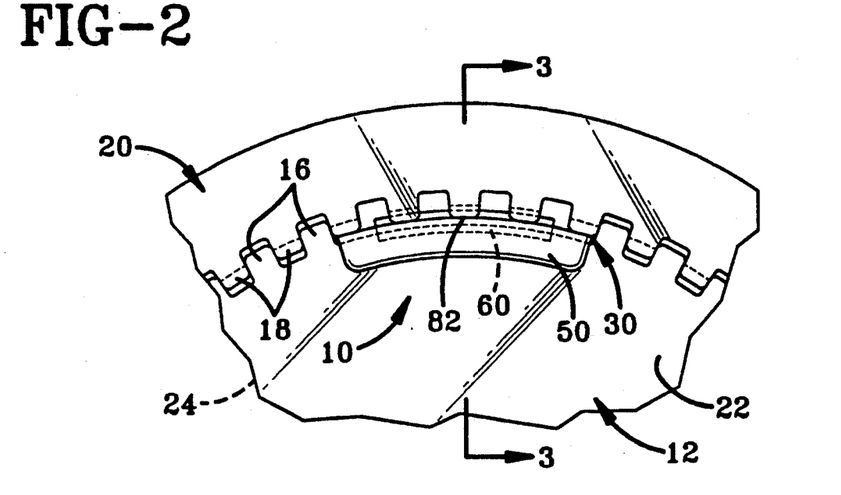
FIG. 2 is an enlarged area of FIG. 1 that focuses more particularly on one of the retainers.
Figure 3:
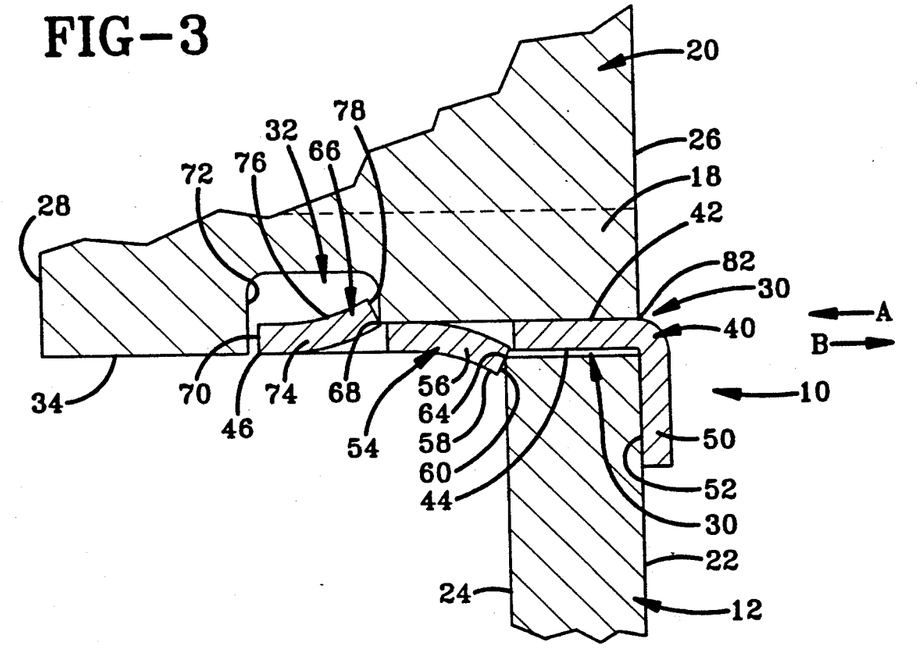
FIG. 3 is a further enlarged cross-sectional view taken substantially along line 3—3 of FIG. 2.

With more particular reference to FIGS. 2 and 3, the radially innermost member 12 may have first and second faces 22 and 24, and the teeth 16 may extend axially between the opposite faces 22 and 24 to form the spline presented from the radially innermost member 12.

The radially outermost member 20 is depicted as having a first face 26 that is located in proximity to the first face 22 on the innermost member 12, but the outermost member 20 need not have a second face, as such, or if it does, the second face 28 may be axially spaced to a sufficient extent from the opposite face 26 that the opposite faces 26 and 28 do not readily avail themselves for being engaged by the retainer 10. Irrespective of the location of the second face 28, the teeth 18 on the outermost member serve as a spline by which rotation of either member 12 or 20 effects rotation of the other rotatable member 20 or 12.

As can more readily be observed from FIG. 3, the retainer 10 secures the two rotatable members 12 and 20 against relative axial displacement. In order operatively to engage the two rotatable members 12 and 20, the retainer 10 is interposed between the two rotatable members 12 and 20. This may be accomplished by removing a finite series of consecutive teeth on one or the other of the rotatable members 12 or 20. The missing teeth provide a slot 30 into which the retainer 10 may be insertably received. The rotatable member from which the teeth were not removed is provided with an annular locking groove 32 for engaging the retainer 10, as will be more fully hereinafter described.

As shown in FIG. 3, the radially innermost member 12 is missing a plurality of consecutive teeth 16 to form a slot 30, and the annular locking groove 32 is recessed into the radially inner, cylindrical surface 34 on the radially outermost member 20 in axially spaced relation from the first face 26 on the outermost member 20.

Figure 4:
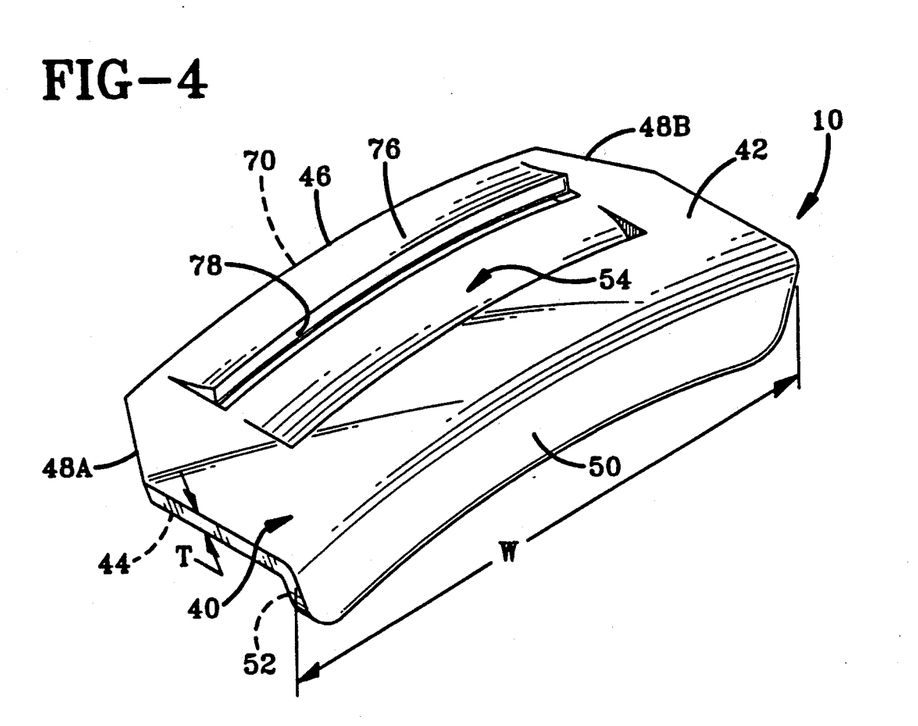
FIG. 4 is a still further enlarged perspective view of the retainer depicted in FIGS. 1 through 3.

The configuration of the retainer 10 can best be seen by reference to FIGS. 3 and 4. The retainer 10 may be fabricated from spring steel or some other material commonly known in the art which exhibits the appropriate physical properties—e.g.: desirable bending and shear strengths as well as a satisfactory modulus of elasticity.

The exemplary retainer 10 has a body portion 40 that may be substantially planar, but will likely have some camber in order to facilitate interengagement with the rotatable members with which it is employed. As depicted, the cambered plane of the retainer 10 may be accurately described as being cylindrically concavo-convex. Accordingly, the body portion 40 has an outer convex face 42 and an inner concave face 44. Typically, the body portion 40 has a width "W" that falls within the range of from about 10 millimeters to about 20 millimeters, and a thickness "T" that falls within the range of from about 1.5 millimeters to about 3.5 millimeters.

For convenience in inserting the retainer 10 into the slot 30, the lead end 46 of the retainer 10 may have tapered corners 48A and 48B. In addition, the opposite end of the body portion 10 may terminate in a first flange 50 that extends substantially orthogonally outwardly from the inner concave face 44 of the body portion 40. When the retainer 10 is interposed between the rotatable members 12 and 20 a stop surface 52 presented from the first flange 50 engages the first face 22 on the innermost rotatable member 12, thereby precluding relative axial displacement between the radially innermost rotatable member 12 and the body portion 40 of the retainer 10 in a first axial and directional frame of reference. Specifically, the retainer 10 is unable to move in the direction of the arrow "A" in FIG. 3.

A pawl-like first locking dog 54 extends radially inwardly from the radially inner concave face 44 of the body portion 40. The first dog 54 is located in a predetermined axially spaced relation relative to the stop surface 52 to engage the edge 64 associated with the second face 24, as is hereinafter more fully described, on the innermost rotatable member 12 when the stop surface 52 engages the first face 22 on that same rotatable member 12. Engagement of the first dog 54 with the second face 24 serves to preclude relative axial displacement between the radially innermost rotatable member 12 and the body portion 40 of the retainer 10 in the opposite axial and directional frame of reference. Specifically, the retainer 10 is unable to move in the direction of the arrow "B" in FIG. 3.

The combination of the stop surface 52 engaging the first face 22 and the dog 54 engaging the second face 24 serves to preclude relative axial movement between the retainer 10 and the innermost rotatable member 12 in either direction.

The locking dog 54 has a shank portion 56 that presents a cam-like ramp 58 which extends angularly inwardly from the convex face 44 of the body portion 40 and terminates in a transversely oriented blocking surface 60. The blocking surface 60 is disposed in radially inwardly spaced relation with respect to the inner concave surface 44 of the body portion 40, and as such, it is the blocking surface 60 on the first locking dog 54 which effectively engages the edge 64 on the innermost rotatable member 12.

That end of the shank portion 56 disposed opposite the blocking surface 60, and thus the end remote from the first flange 50, is preferably joined integrally to the body portion 40 of the retainer 10. In fact, the preferred manner by which to form the first locking dog 54 is to lance it from the body portion 40. Because the locking dog 54 has been struck from the body portion 40, the shank portion 56 of the dog 54 will have the same modulus of elasticity as the body portion 40 of the retainer 10. Hence, astute selection of the material from which the retainer 10 is fabricated will assure that the dog 54 will have sufficient resiliency to permit it, in response to the application of a suitable biasing force against the ramp 88, to be swung into general alignment with the body portion 40, and, upon release of the biasing force, to swing back into its angularly inwardly disposed orientation relative to the inner, concave face 44 on the body portion 40.

Thus, when one inserts the retainer 10 into the slot 30, engagement of the ramp 58 with the edge 62 formed by the juncture of the first face 22 with the slot 30 will require sufficient axially directed force to the retainer 10 biasingly to displace the resilient locking dog 54 and allow it to be slid along the slot 30 until the blocking surface 60 clears the edge 64 formed by the juncture of the slot 30 with the second face 24. When the parts are so disposed, the resilience of the shank portion 56 will cause the dog 54 to swing inwardly and position the blocking surface 60 in engagement with the edge 64.

Although the retainer 10 is sufficiently inexpensive as to be readily dispensable, it may be removed from its locking interaction with the innermost rotatable member 12 by biasing the first dog 54 radially outwardly until the blocking surface 60 clears the edge 64. When the blocking surface 60 clears the edge 64, the retainer 10 can be displaced axially with respect to the innermost rotatable member 12.

A pawl-like second locking dog 66 extends radially outwardly from the radially outer convex face 42 of the body portion 40. The second dog 66 is located in a predetermined axially spaced relation relative to the leading end 46 to permit engagement with the edge 68 when the second stop surface 70 engages the side wall 72 of the locking groove 32 disposed in opposition to the edge 68. Engagement of the second dog 66 with the edge 68 serves to preclude relative axial displacement between the radially outermost rotatable member 20 and the body portion 40 of the retainer 10 in one axial and directional frame of reference. Specifically, the outermost rotatable member 20 is now unable to move in the direction of the arrow "A" in FIG. 3.

The combination of the second stop surface 70 engaging the side wall 72 of the locking groove 32 and the second dog 66 engaging the edge 68 serves to preclude relative axial movement between the retainer 10 and the outermost rotatable member 20 in either direction.

The locking dog 66 also has a shank portion 74 that presents a cam-like ramp 76 which extends angularly outwardly from the outer convex face 42 of the body portion 40 and terminates in a transversely oriented blocking face 78. The blocking face 78 is disposed in radially outwardly spaced relation with respect to the outer convex surface 42 of the body portion 40, and as such, it is the blocking face 78 on the second locking dog 66 which effectively engages the edge 68 presented by the juncture of a side wall on the locking groove 32 with the inner cylindrical surface 34 of the outermost rotatable member 20.

That end of the shank portion 74 oppositely from the blocking face 78, and thus the end proximate to the second stop surface 70, is preferably joined integrally to the body portion 40 of the retainer 10. In fact, the preferred manner by which to form the second locking dog 66 is also to lance it from the body portion 40. Because the second locking dog 66 has been struck from the body portion 40, the shank portion 74 of the dog 66 will also have the same modulus of elasticity as the body portion 40 of the retainer 10. Hence, astute selection of the material from which the retainer 10 is fabricated will assure that the dog 66 will also have sufficient resiliency to permit it, in response to the application of a suitable biasing force against the ramp 76, to be swung into general alignment with the body portion 40, and upon release of the biasing force, to swing back into its angularly outwardly disposed orientation relative to the outer convex face 42 of the body portion 40.

Thus, when one inserts the retainer 10 into the slot 30, engagement of the ramp 76 with the edge 82 presented at that side of the teeth 18 disposed in generally coplanar relationship with the first face 26 of the outermost rotatable member 20 will require sufficient axially directed force to the retainer 10 biasingly to displace the resilient locking dog 66 and allow it to be slid along the slot 30 until the blocking face 78 clears the edge 68. When the parts are so disposed, the resilience of the shank portion 74 will cause the dog 66 to swing radially outwardly and position the blocking face 78 in engagement with the edge 68.

The retainer 10 can be disengaged from its locking interaction with the outermost rotatable member 20 by biasing the second dog 66 radially inwardly until the blocking surface 78 clears the edge 68. When the blocking surface 78 clears the edge 68, the retainer 10 can be displaced axially with respect to the outermost rotatable member 20.

Figure 5:
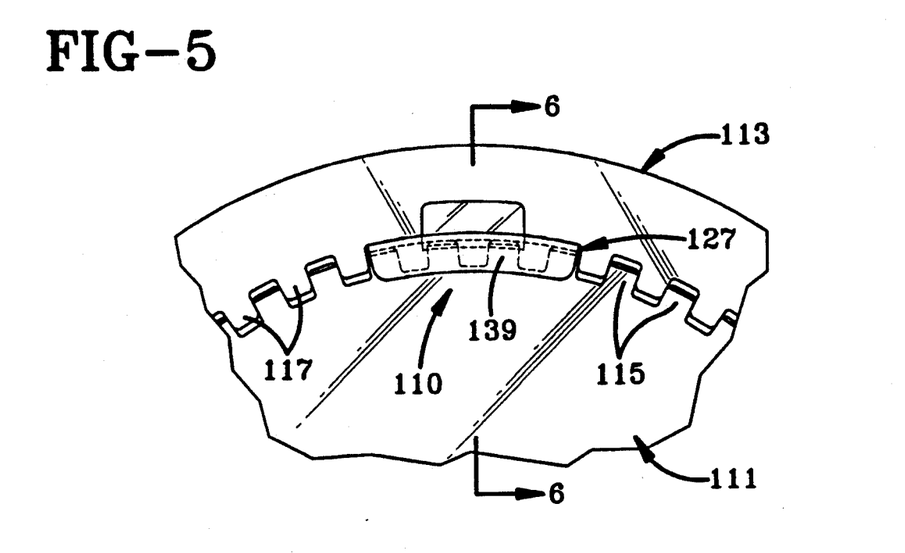
FIG. 5 is a view similar to FIG. 2 but depicting an alternative embodiment of a retainer embodying the concepts of the present invention.
Figure 6:
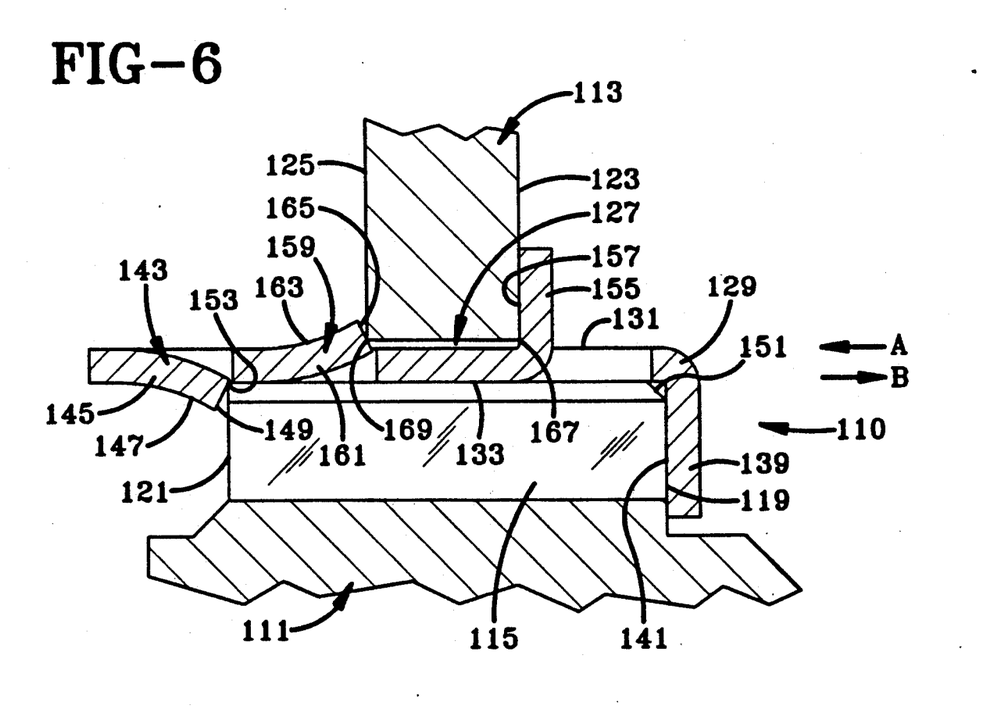
FIG. 6 is an enlarged cross-sectional view taken substantially along line 6—6 of FIG. 5.
Figure 7:
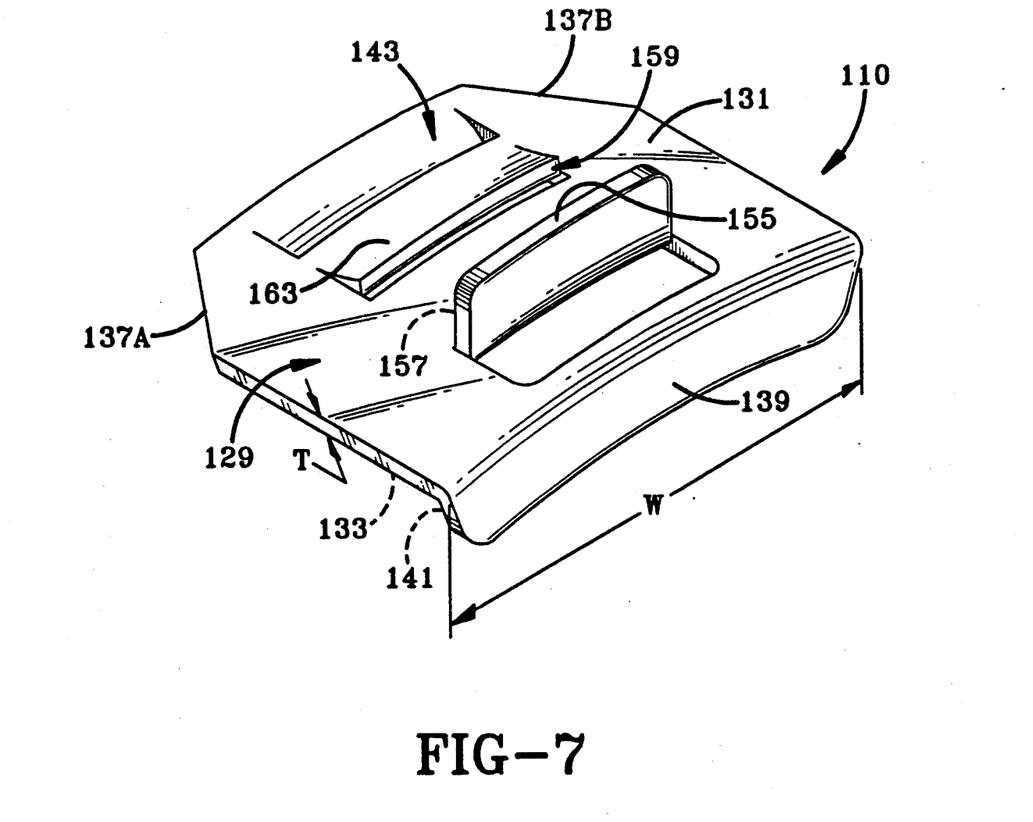
FIG. 7 is a still further enlarged perspective view of the retainer depicted in FIGS. 5 and 6.

An alternative configuration for a retainer embodying the concepts of the present invention is identified by the numeral 110 in FIGS. 5 through 7, inclusive. The alternative retainer 110 is particularly adapted for use in conjoining rotatable inner and outer members 111 and 113, respectively, which are each provided with axially spaced shoulders with respect to which the retainer 110 may cooperatively interact. As seen in FIG. 5, the radially innermost member 111 has a plurality of teeth 115 which extend about the periphery of the innermost member 111 meshingly to engage the teeth 117 on the interior circumference of the rotatably outermost member 113. While a plurality of the retainers 110 may be employed, as was explained with respect to the first embodiment, only one retainer 110 will be described inasmuch as the description of one such device will impart a full understanding of the invention.

With more particular reference to FIG. 6 it can be observed that the teeth 115 on the innermost member 111 extend between first and second radially disposed shoulders 119 and 121 to form the spline presented from the innermost member 111. Similarly, the teeth 117 on the radially outermost rotatable member 113 extend between first and second radially disposed shoulders 123 and 125 to form the spline presented from the outermost member 113.

As can be more readily observed from FIG. 6, the retainer 110 secures the two rotatable members 111 and 113 against relative axial displacement. In order operatively to engage the two rotatable members 111 and 113, the retainer 110 is interposed between the two rotatable members 111 and 113. This may be accomplished by removing a finite series of consecutive teeth on one or the other of the rotatable members 111 or 113. The missing teeth provide a slot 127 into which the retainer 110 may be insertably received. As shown, the teeth 115 are removed from the radially outermost rotatable member 113 to form the slot 127.

As best represented in FIGS. 6 and 7, the retainer 110 has a body portion 129 that may also be substantially planar, but will likely have some camber in order to facilitate interengagement with the rotatable members 111 and 113 with which the retainer 110 is employed. As depicted, the cambered plane of the retainer 110 may more accurately be defined as being cylindrically concavo-convex. Accordingly, the body portion 129 has a radially outer convex surface 131 and a radially inner concave surface 133. Typically, too, the body portion 129 has a thickness that falls within the range of from about 1.5 millimeters to about 3.5 millimeters and a width within the range of from about 10 millimeters to 20 millimeters.

For convenience in inserting the retainer 110 into the slot 127, the lead end 135 of the retainer 110 may have tapered corners 137A and 137B. In addition, the opposite end of the body portion 110 may terminate in a first flange 139 that extends substantially orthogonally outwardly from the body portion 129. When the retainer 110 is interposed between the rotatable members 111 and 113, a stop surface 141 presented from the first flange 139 engages the first shoulder 119 on the radially innermost rotatable member 111, thereby precluding relative axial displacement between the radially innermost rotatable member 111 and the body portion 129 of the retainer 110 in one axial and directional frame of reference. Specifically, the retainer 110 is unable to move in the direction of the arrow "A" in FIG. 6.

A pawl-like first locking dog 143 extends radially inwardly from the radially inner concave face 133 of the body portion 40. The first dog 143 is located in a predetermined axially spaced relation relative to a stop surface 141 on the first flange 139 in order to engage the second shoulder 121 on the innermost rotatable member 111 when the stop surface 141 engages the first shoulder 119 on that same rotatable member 111. Engagement of the first dog 143 with the second shoulder 121 serves to preclude relative axial displacement between the radially innermost rotatable member 111 and the body portion 129 of the retainer 110 in the opposite axial and directional frame of reference. Specifically, the retainer 110 is unable to move in the direction of the arrow "B" in FIG. 6 by virtue of the engagement between the first dog 143 and the innermost rotatable member 111.

The combination of the stop surface 141 engaging the first shoulder 119 and the dog 143 engaging the second shoulder 121 serves to preclude relative axial movement between the retainer 110 and the radially innermost rotatable member 111 in either direction.

The locking dog 143 has a shank portion 145 that presents a cam-like ramp 147 which extends angularly inwardly from the inner concave face 133 of the body portion 129 and terminates in a transversely oriented blocking face 149. The blocking face 149 is disposed in radially inwardly spaced relation with respect to the inner concave face 133 of the body portion 129, and as such, it is the blocking face 149 on the first locking dog 143 which effectively engages the edge 153 presented at the juncture of the apex on the teeth 115 with the second shoulder 121 on the innermost rotatable member 111 to embrace the member 111 between the first dog 143 and the flange 139.

That end of the shank portion 145 oppositely from the blocking face 149, and thus the end most remote from the first flange 139, is preferably joined integrally to the body portion 129 of the retainer 110. In fact, the preferred manner by which to form the first locking dog 141 is also to lance it from the body portion 129. Because the locking dog 143 has been struck from the body portion 129, the shank portion 145 of the dog 143 will have the same modulus of elasticity as the body portion 129 of the retainer 110. Hence, astute selection of the material from which the retainer 110 is fabricated will assure that the dog 143 will have sufficient resiliency to permit it, in response to the application of a suitable biasing force against the ramp 147, to be swung into general alignment with the body portion 129, and upon release of the biasing force, to swing back into its angularly inwardly disposed orientation relative to the inner, concave face 133 of the body portion 129.

Thus, when one inserts the retainer 110 into the slot 127, engagement of the ramp 147 with the edge 151—which may, as depicted, be haunched—formed by the juncture of the first shoulder 119 on the innermost rotatable member 111 with the apex of each tooth 115 on that same rotatable member 111 will require sufficient axially directed force to the retainer 110 biasingly to displace the resilient locking dog 141 and allow it to be slid along the slot 127 until the blocking face 149 clears the edge 153 formed by the juncture of the second shoulder 121 with the apex of each tooth 115. When the parts are so disposed, the resilience of the shank portion 145 will cause the dog 143 to swing inwardly and position the blocking face 149 in engagement with the edge 153.

The retainer 110 can be removed from its locking interaction with the innermost rotatable member 111 by biasing the first dog 143 radially outwardly until the blocking surface 149 clears the edge 153. When the blocking surface 149 clears the edge 153, the retainer 110 can be displaced axially with respect to the innermost rotatable member 111.

A second flange 155 extends radially outwardly from the outer convex face 131 on the body portion 129. The preferred manner by which to form the second flange 155 is to lance it from the body portion 129 in a manner similar to that by which the first locking dog 143 was struck from the body portion 129, although the second flange 155 is preferably oriented substantially orthogonally with respect to the body portion 129.

In any event, the second flange 155 presents a stop surface 157 which will engage the first shoulder 123 presented from the outermost rotatable member 113. Engagement of the stop surface 157 with the first shoulder 123 precludes axial displacement of the outermost rotatable member 113 relative to the retainer 110 in one axial and directional frame of reference. Specifically, the outermost rotatable member 113 is precluded from moving in the direction represented by the arrow "B" in FIG. 6 when the retainer engages the outermost rotatable member 113, as previously described.

A pawl-like second locking dog 159 extends radially outwardly from the radially outer convex face 131 of the body portion 129. The second dog 159 is located in a predetermined axially spaced relation relative to the stop surface 157 to engage the edge 169 formed at the juncture of the second shoulder 125 with the apex of the teeth 117 on the outermost rotatable member 113 when the stop surface 157 engages the first shoulder 123 on that same rotatable member 113. Engagement of the second dog 159 with the edge 169 serves to preclude relative axial displacement between the radially outermost rotatable member 113 and the body portion 129 of the retainer 110 in the opposite axial and directional frame of reference. Specifically, the outermost rotatable member 113 is unable to move in the direction of the arrow "A" in FIG. 6 relative to the retainer 110.

The second locking dog 159 also has a shank portion 161 that presents a cam-like ramp 163 which extends angularly outwardly from the outer convex face 131 of the body portion 129 and terminates in a transversely oriented blocking face 165. The blocking face 165 is disposed in radially outwardly spaced relation with respect to the outer convex face 131 of the body portion 129, and as such, it is the blocking face 165 on the second locking dog 159 which effectively engages the edge 169 on the outermost rotatable member 113.

That end of the shank portion 161 oppositely from the blocking face 165, and thus the end remote from the second flange 155, is preferably joined integrally to the body portion 129 of the retainer 110. As with the previously described locking dogs, the preferred manner by which to form the second locking dog 159 is to lance it from the body portion 129. Because the locking dog 159 has been struck from the body portion 129, the shank portion 161 of the dog 159 will have the same modulus of elasticity as the body portion 129 of the retainer 110. Hence, astute selection of the material from which the retainer 110 is fabricated will also assure that the dog 159 will have sufficient resiliency to permit it, in response to the application of a suitable biasing force against the ramp 163, to be swung into general alignment with the body portion 129, and upon release of the biasing force, to swing back into its angularly outwardly disposed orientation relative to the outer convex face 131 of the body portion 129.

Thus, when one inserts the retainer 110 into the slot 127, engagement of the ramp 163 with the edge 167 formed by the juncture of the first shoulder 123 with the apex of each tooth 117 presented from the outermost rotatable member 113, one must impart sufficient axially directed force to the retainer 110 biasingly to displace the resilient locking dog 159 and allow it to be slid along the slot 127 until the blocking face 165 clears the second edge 169 presented from the teeth 117 on the outermost rotatable member 113. When the parts are so disposed, the resilience of the shank portion 161 will cause the dog 159 to swing outwardly and position the blocking face 165 in engagement with the second edge 169.

The retainer 110 can be removed from its locking interaction with the outermost rotatable member 113 by biasing the second dog 159 radially inwardly until the blocking face 165 clears the edge 169. When the blocking face 165 clears the edge 169, the retainer 110 can be displaced axially with respect to the outermost rotatable member 113.

The combination of the stop surface 141 on the first flange 139 engaging the first shoulder 119 and the dog 143 engaging the edge 153 on the innermost rotatable member 111 serves to preclude relative axial movement between the retainer 110 and the innermost rotatable member 111 in either direction. That engagement, taken in conjunction with the combination of the stop surface 157 on the second flange 155 engaging the first shoulder 123 and the dog 159 engaging the second edge 169 on the outermost member 113, serves to preclude relative axial movement between the retainer 110 and either of the members 111 or 113, in either direction.

Figure 8:
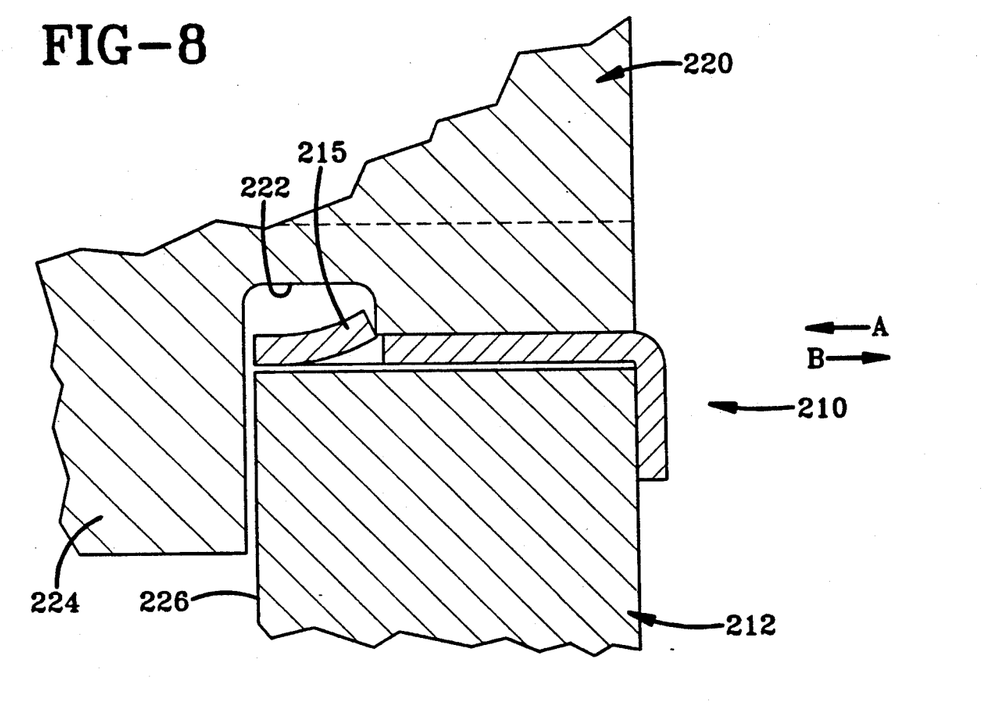
FIG. 8 is a cross-sectional view of another alternative embodiment.
Figure 9:
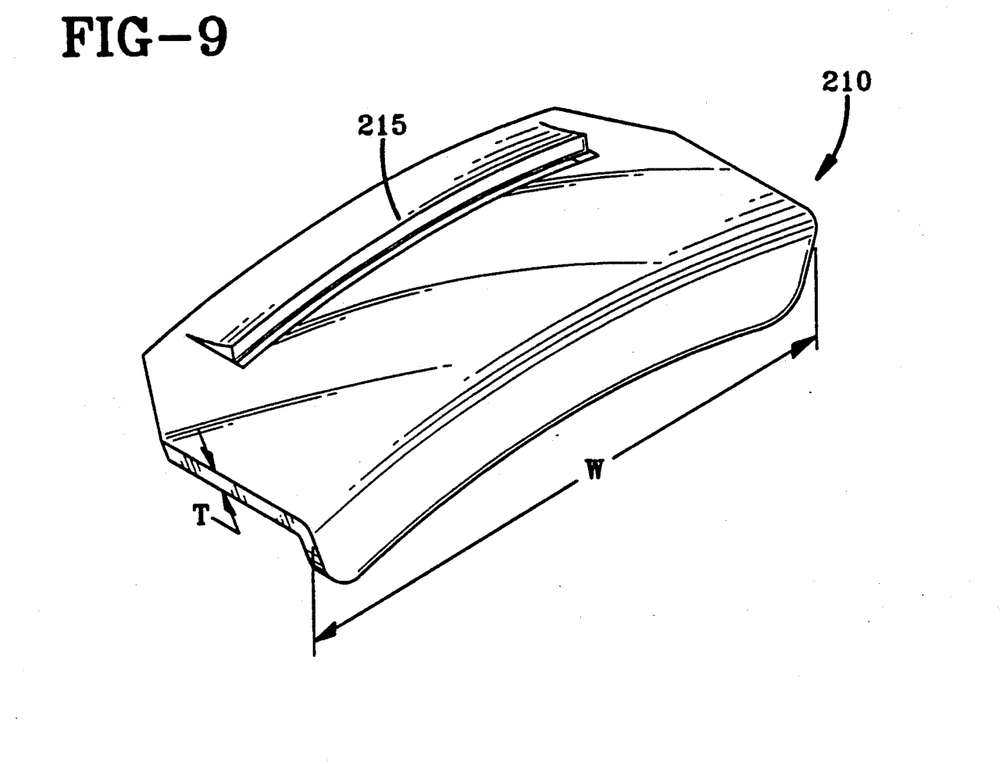
FIG. 9 is a perspective view of the retainer depicted in FIG. 8.

FIGS. 8 and 9 describe an alternative embodiment, wherein two splined components comprising an outer member 220 and an inner member 212 are axially retained in the direction of arrow "B" by a retainer 210 and in the direction of arrow "A" by cooperation of a flange or shoulder 224 on the outer member 220 and an end wall 226 on the inner member 212. The outer member 220 has a locking groove 222 which is selectively engaged by a locking dog 215 formed in the retainer 210. The retainer 210 is inserted between the inner member 212 and the outer member 220 in a manner similar to that described above for the other embodiments. The thickness "T" and width "W" of the retainer 210 are preferably within the typical ranges for the similar dimensions described above for the retainer 10.

Consequently, it has now been described how insertion of a retainer embodying the concepts of the present invention between two splined rotatable members not only precludes relative axial translation of those members but also accomplishes the other objects of the invention.

The embodiments of this invention in which an exclusive property or privilege is claimed are defined as follows:

1. A retainer for releasably securing a splined radially innermost rotatable member to a splined radially outermost rotatable member in order to preclude relative axial displacement between the radially innermost and the radially outermost rotatable members, said retainer comprising:
    a body portion;
    a first stop surface presented from said body portion to engage one of said rotatable members and thereby preclude relative axial movement between said body portion and said one rotatable member in one axial and directional frame of reference;
    a first dog extending outwardly from said body portion to engage said same rotatable member engaged by said first stop surface and thereby preclude relative axial movement between said body portion and said one rotatable member in the opposite axial and directional frame of reference;
    a second stop surface presented from said body portion to engage the second of said rotatable members and thereby preclude relative axial movement between said body portion and said second rotatable member in one axial and directional frame of reference;
    a second dog extending outwardly from said body portion to engage said second rotatable member and thereby preclude relative axial movement between said body portion and said second rotatable member in the opposite axial and directional frame of reference;
    said dogs being adapted releasably to engage said rotatable members;
    said first stop surface is presented from a first flange extending substantially orthogonally outwardly from said body portion;
    said first dog is disposed in axially spaced relation from said first flange to embrace one of the rotatable members therebetween;
    said body portion is substantially planar;
    said first dog is unitary with and bent outwardly from said substantially planar body portion; and
    said first dog has a modulus of elasticity which permits said first dog to be forcibly depressed so as to lie within said substantially planar body portion but which will cause said first dog to spring outwardly from said substantially planar body portion upon the release of said depressing force.

2. A retainer, as set forth in claim 1, wherein:
    said second dog is unitary with and bent outwardly from said substantially planar body portion;
    said second dog is spaced from said second stop surface such that said second dog and said second stop surface can coact with a recess extending at least partially circumferentially of the other rotatable member.

3. A retainer, as set forth in claim 2, wherein:

said second dog also has a modulus of elasticity which will permit said second dog to be forcibly depressed so as to lie within said substantially planar body portion but which cause said second dog to spring outwardly from said substantially planar body portion upon the release of said depressing force.

4. In combination with a tooth-splined innermost rotatable member connected to a tooth-splined outermost rotatable member for simultaneous rotation resulting from the interengagement of the teeth forming the splines, a retainer to preclude relative axial displacement between the innermost and the outermost rotatable members;

a successive plurality of teeth removed from one of the rotatable members to form a slot between said innermost and said outermost rotatable members;

first and second radially disposed side faces on that rotatable member from which said teeth have been removed;

the retainer having a body portion that is insertably receivable within said slot;

a first flange extending substantially orthogonally outwardly from said body portion to engage said first radial face on that rotatable member from which said teeth have been removed;

a first locking lug extending outwardly from said body portion in axially spaced relation from said first flange;

said first locking dog adapted to interact with said second face on that rotatable member from which said teeth have been removed to preclude relative axial displacement between said body portion and that rotatable member;

said locking dog having sufficient resilience releasably to engage said rotatable member; and means to preclude relative axial displacement between said body portion and said other rotatable member.

5. The combination, as set forth in claim 4, wherein said means to preclude relative axial displacement between said body portion and said other rotatable member further comprises:

an annular locking groove recessed within said other rotatable member;

a second locking dog extending outwardly from said body portion in a direction opposite from said first locking dog releasably to engage said locking groove; and a blocking surface presented from said body portion to engage said locking groove such that the engagement of said locking dog and said blocking surface with said other rotatable member precludes relative axial displacement between said body portion and said other rotatable member.

6. The combination, as set forth in claim 4, wherein said means to preclude relative axial displacement between said body portion and said other rotatable member further comprises:

first and second shoulders presented from said other rotatable member;

a second flange extending substantially orthogonally outwardly from said body portion in a direction opposite from said first flange;

a second stop surface presented from said second flange to engage said first shoulder on said other rotatable member; and a second locking dog extending outwardly from said body portion in a direction opposite from said first locking dog releasably to engage said second shoulder of said other rotatable member.

* * * * *